G. E. VANDENBURGH.
REINFORCING BAR.
APPLICATION FILED JULY 1, 1916.
Reissued Aug. 15, 1916.
14,182.
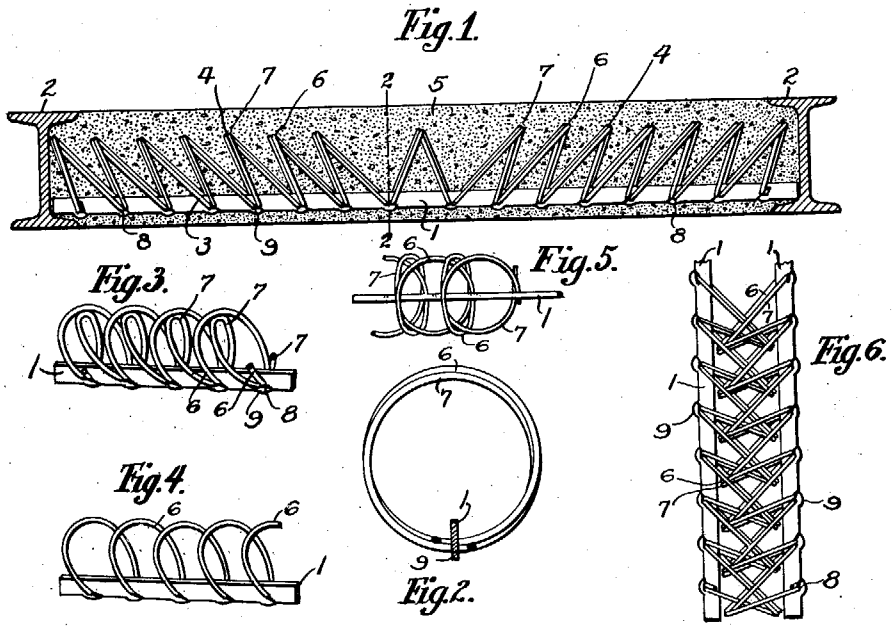
INVENTOR.
George E. Vandenburgh.
BY Carlos P. Griffin
ATTORNEY.

UNITED STATES PATENT OFFICE.

GEORGE E. VANDENBURGH, OF SAN FRANCISCO, CALIFORNIA.

REINFORCING-BAR.

14,182. Specification of Reissued Letters Patent. Reissued Aug. 15, 1916.

Original No. 841,741, dated January 22, 1907, Serial No. 315,959. Application for reissue filed July 1, 1916. Serial No. 107,203.

*To all whom it may concern:*

Be it known that I, GEORGE E. VANDENBURGH, a citizen of the United States, and recently of Washington, District of Columbia, and now residing at San Francisco, California, have invented certain new and useful Improvements in Reinforcing-Bars, of which the following is a specification, reference being had therein to the accompanying drawings.

This invention relates to a reinforcing-bar particularly adapted for cement and concrete construction wherein the bar is embedded in the plastic body to be supported thereby.

The invention has for an object to provide a reinforcing-bar with one or more spirally-disposed coils secured to the bar so as to provide an extended area of contact adapted to resist strain longitudinally and laterally of the bar and to form a truss within the body of concrete or other plastic material which provides the maximum of supporting strength in the arch or surface to be formed.

Other and further objects and advantages of the invention will be hereinafter set forth, and the novel features thereof defined by the appended claims.

In the drawings, Figure 1 is a vertical section showing the bar applied to supporting girders or beams. Fig. 2 is an enlarged vertical section on the line 2—2, Fig. 1. Fig. 3 is a detail perspective of the primary and secondary coils shown in Fig. 1. Fig. 4 is a similar view of a modified form using one coil. Fig. 5 is a detail plan of the form shown in Fig 3, and Fig. 6 is an elevation of two meshing coils used for girder and column construction.

Like numerals of reference indicate like parts in the several figures of the drawings.

The numeral 1 designates a bar which may be of any desired construction or configuration and supported in any preferred manner. For instance, when used in arch construction it is adapted to rest upon the base of the beams or girders 2 sufficiently above the lower surface thereof to provide for the facing of the concrete or cement beneath the lower face of the bar. The coils 4 are secured to the bar in any desired manner—for instance, as hereinafter described—and the plastic material or cement-filling 5 applied so as to surround the coils and bar and embed the same therein to form a truss construction.

The bar may be provided with a primary coil 6, extending in one direction, as shown in Fig. 4, which is sufficient in light construction; but when a heavier construction is to be used a secondary coil 7 is provided, which extends in the opposite direction to the coil 6 and through the same so as to cross beneath the coil 6 at a point directly above the bar, thus providing a construction in which all lateral pull or strain of the coil is avoided, owing to the equalization thereof by the oppositely-extending coils and the tendency of the coils to move or flatten toward the face of the bar resisted. This preferred construction is shown in Figs. 1 and 3, and it is also desirable that both of the coils be deflected away from the center of the bar, as shown in Fig. 1, as the greatest supporting strain carried by the arch is at the center thereof, and this deflection therefore resists such strain and tends to draw the coils upward into a position at right angles to the bar.

As a preferred means of securing the coils to the bar I have shown a series of kerfs 8 in one face of the bar inclined away from the center of the bar toward the opposite ends thereof, and the coils are seated within these kerfs and held therein by means of the integral spurs 9, which are forced downward upon the coils when inserted and permanently retain them in position.

In Fig. 6 a modified application of the invention is shown where two of the bars are disposed parallel to each other, with their coils intermeshing, for use in column or girder construction, wherein such a construction provides the maximum of strength with the minimum of weight in the reinforcing material.

In the operation of the invention it will be seen that the bar supporting the coil resists any movement thereof longitudinally of the bar and provides the necessary strength upon which the truss structure formed by the coils is carried. These coils being extended in opposite directions and embedded in the material provide the maximum strength to resist either lateral or longitudinal pressure with the minimum weight and quantity of material, as owing to their opposite direction of curvature they effectually oppose the strain placed thereon, while their deflection toward the opposite ends of the bar resists the central downward strain of the arch.

It will be seen that this form of bar is very simple and economical in construction while embodying the greatest efficiency in use. This bar, although described in connection with arch and column construction, is adapted for use in any character of metal, reinforced concrete, or cement construction.

Having now described my invention and set forth its merits, what I claim, and desire to secure by Letters Patent, is—

1. A concrete reinforcing consisting of a bar having a plurality of integral spurs, and a spiral coil permanently secured thereto by having the spurs bent down on the several coils, the coils extending beyond and free of the bar at the opposite side therefrom to the securing point.

2. A concrete reinforcing consisting of a bar having integral means to secure a coil thereto, and a spiral coil permanently secured to the bar in each convolution and extended beyond and free of said bar at the opposite side therefrom to the securing point.

3. A reinforcing-bar provided upon one edge with a series of kerfs each having an integral overlapping spur, and a coil disposed in said kerfs, each convolution thereof being retained beneath one of said spurs.

4. In a reinforcing-bar, a spiral coil permanently secured thereto by spurs bearing on each convolution thereof and extended beyond and free of said bar at the opposite side therefrom to the securing-point, said coils being deflected in opposite directions from the center of the bar toward the ends thereof.

5. A reinforcing-bar provided upon one edge with a series of kerfs disposed diagonally to the length of the bar each having an overlapping integral spur projected toward the center of the bar, and a coil disposed in said kerfs and retained beneath said spurs.

6. A reinforcing-bar provided with a spirally-disposed coil secured thereto and extended free of said bar, and a secondary spirally-disposed coiled strand secured to the bar and extending in the opposite direction to the first mentioned coil.

7. A reinforcing-bar provided at opposite sides of its center with spiral coils secured thereto and deflected in opposite directions from the center of the bar, and a secondary spiral coil secured to the bar and extended in the opposite direction to the first-mentioned coil throughout the length thereof.

In testimony whereof I have hereunto set my hand this 24th day of June, 1916.

GEORGE E. VANDENBURGH.